United States Patent [19]

Ishikawa et al.

[11] 4,048,124

[45] Sept. 13, 1977

[54] PRESSURE SENSITIVE ADHESIVE

[75] Inventors: Atsuo Ishikawa, Kamakura; Hidemi Tsubaki, Kawasaki; Hitoshi Takahata; Riso Iwata, both of Kamakura; Yonesaku Shinohara, Toyama, all of Japan

[73] Assignee: Nippon Zeon Co. Ltd., Tokyo, Japan

[21] Appl. No.: 656,978

[22] Filed: Feb. 10, 1976

[30] Foreign Application Priority Data

Feb. 13, 1975 Japan .................................. 50-18341

[51] Int. Cl.$^2$ .......................... C08L 7/00; C08L 9/00; C08L 9/06
[52] U.S. Cl. ...................................... 260/5; 260/888; 260/889; 260/894; 526/308; 427/207 B
[58] Field of Search .......................... 260/5, 888, 889; 526/308

[56] References Cited

U.S. PATENT DOCUMENTS

| 3,509,239 | 4/1970 | Tindall | 260/5 |
| 3,554,940 | 1/1971 | Arakawa et al. | 260/888 |
| 3,846,352 | 11/1974 | Bullard et al. | 260/889 |
| 3,893,986 | 7/1975 | Komai et al. | 526/308 |
| 3,960,823 | 6/1976 | Komai et al. | 526/308 |
| 3,966,690 | 6/1976 | Mathews et al. | 260/5 |

Primary Examiner—John C. Bleutge
Attorney, Agent, or Firm—Sherman & Shalloway

[57] ABSTRACT

A pressure sensitive adhesive composition comprising (A) 100 parts by weight of a conjugated diene-type rubber, and (B) 30 to 250 parts by weight of a hydrocarbon resin having a softening point of 60° C to 140° C and comprising (a) 45 to 85% by weight of a unit derived from 1,3-pentadiene, (b) 10 to 45% by weight of a unit derived from α-methylstyrene, (c) 3 to 20% by weight of a unit derived from cyclopentene, (d) 0 to 20% by weight of a unit derived from 1,3-butadiene, and (e) 0 to 5% by weight of a unit derived from a copolymerizable monomer selected from isoprene, cyclopentadiene and dicyclopentadiene.

10 Claims, No Drawings

PRESSURE SENSITIVE ADHESIVE

This invention relates to an improved pressure sensitive adhesive composition, and more specifically, to a pressure sensitive adhesive composition having improved tackiness comprising a conjugated diene-type rubber and a hydrocarbon resin containing 1,3-pentadiene, α-methylstyrene and cyclopentene as main ingredients.

Pressure sensitive adhesive compositions are widely used in the fields of tapes such as cellophane tapes or gum tapes, or sealants. These compositions are generally preprepared by blending tackifying resins with conjugated diene-type rubbers. Rosin-type resins have previously been used widely as the tackifying resins, but in recent years, the shortage of rosin-type resins from naturally occurring raw materials has stimulated the development of techniques for producing new tackifying resins by cationic polymerization. For example, it has been found that pressure sensitive adhesive compositions having superior tackiness can be obtained by mixing a resin obtained by copolymerizing 1,3-pentadiene with cyclopentene (Japanese Laid-Open Patent Publication No. 58077/73) or a resin obtained by copolymerizing 1,3-pentadiene, 2-methyl-2-butene, dicyclopentadiene and α-methylstyrene (Japanese Laid-Open Patent Publication No. 80195/73) with rubber. These pressure sensitive adhesive compositions have superior adhesive strength and cohesive strength to pressure sensitive adhesive compositions containing known hydrocarbon resins as a tackifying resin, which are substantially equivalent to those of rosin-based pressure sensitive adhesive compositions. But the tackiness of these pressure sensitive adhesive compositions is far inferior to that of the rosin-based pressure sensitive adhesive compositions, and there has been a strong desire to improve their property.

Accordingly, it is an object of this invention to provide a pressure sensitive adhesive composition having superior tackiness. Another object of this invention is to provide a pressure sensitive adhesive composition having superior tackiness, adhesiveness and cohesive strength.

We have found that these objects of the invention can be achieved by using as a tackinfying resin a hydrocarbon resin comprising (a) 45 to 85% by weight of a unit derived from 1,3-pentadiene, (b) 10 to 45% by weight of a unit derived from α-methylstyrene, (c) 3 to 20% by weight of a unit derived from cyclopentene, (d) 0 to 20% by weight of a unit derived from 1,3-butadiene and (e) 0 to 5% by weight of a unit derived from a copolymerizable monomer selected from isoprene, cyclopentadiene and dicyclopentadiene, and having a softening point of from 60° C. to 140° C.

Thus, according to this invention, there is provided a pressure sensitive adhesive composition comprising (A) 100 parts by weight of a conjugated diene-type rubber and (B) 30 to 250 parts by weight of the above-mentioned hydrocarbon resin.

The conjugated diene-type rubber (A) is natural rubber or a synthetic rubber containing at least 50% by weight or a conjugated diolefin unit in the polymer chain. Specific examples of the synthetic rubber are polyisoprene, polybutadiene, a butadiene/styrene copolymer, a butadiene/isoprene copolymer, an isoprene/styrene copolymer, and a butadiene/acrylonitrile copolymer. Of these, natural rubber and synthetic cis-1,4-polyisoprene are most preferred. These synthetic rubbers can be prepared by known methods such as solution polymerization, emulsion polymerization, or bulk polymerization. They are not limited by the method of preparation, but any synthetic conjugated diene-type rubbers having a Mooney viscosity ($ML_{1+4}/100°$ C.) of at least 30 can generally be used.

The hydrocarbon resin (B) of the above-mentioned composition which is used as a tackifying resin can be prepared by copolymerizing a monomeric mixture comprising 35 to 85% by weight of 1,3-pentadiene, 10 to 50% by weight of α-methylstyrene, 5 to 30% by weight of cyclopentene, 0 to 15% by weight, preferably 2 to 10% by weight, of 1,3-butadiene, and 0 to 5% by weight of the above-mentioned copolymerizable monomer in the presence of a Friedel-Crafts catalyst. A hydrocarbon resin comprising 45 to 85% by weight of a unit derived from 1,3-pentadiene (a), 10 to 45% by weight of a unit derived from α-methylstyrene (b), 3 to 20% by weight of a unit derived from cyclopentene (c), and 2 to 15% by weight of a unit derived from 1,3-butadiene (d), and having a softening point of from 60° C. to 120° C. is especially preferred as the tackifying resin.

The pressure sensitive adhesive composition of this invention has far superior tackiness to pressure sensitive adhesive compositions using a binary copolymer of 1,3-pentadiene and cyclopentene or a binary copolymer of 1,3-pentadiene and α-methylstyrene as a tackifying resin. This tackiness is markedly improved especially when a four-component hydrocarbon resin consisting of a 1,3-pentadiene unit (a), an α-methylstyrene unit (b), a cyclopentene unit (c) and a 1,3-butadiene unit (d) is used as the tackifying resin. Hydrocarbon resins having a high content of the α-methylstyrene unit or the cyclopentene unit have a lowered softening point, and moreover, the reactivities of the ingredients in the preparation of the resins are not feasible. Hydrocarbon resins having more than 20% by weight of the 1,3-butadiene unit have then same defects. It is essential therefore to limit the composition of the hydrocarbon resin to the range specified above. Desirably, the hydrocarbon resin does not contain a unit derived from the copolymerizable monomer (e) selected from isoprene, cyclopentadiene and dicyclopentadiene. It may be included only in an amount which does not impair the tackifying property of the hydrocarbon resin, that is, in an amount of up to 5% by weight. Furthermore, the hydrocarbon resin can contain a small amount, for example up to 15% by weight, of a unit derived from a monoolefin containing 4 to 100 carbon atoms so long as it does not adversely affect the properties of the hydrocarbon resin.

The pressure sensitive adhesive composition of this invention can be obtained by blending 100 parts by weight of the conjugated diene-type rubber (A) and 30 to 250 parts by weight, preferably 50 to 200 parts by weight, of the hydrocarbon resin (B). The blending can be performed by a mechanical means such as a roll mixer or Banbury mixer. Usually, however, the two components (A) and (B) are mixed in a solvent which can dissolve both. The type of solvent used for this purpose is not particularly limited, and examples include aliphatic, aromatic or alicyclic hydrocarbons or halogenated hydrocarbons, such as pentane, hexane, heptane, benzene, toluene, xylene, cyclohexane, and chlorobenzene.

Although it is possible to add the resin (B) to a solution of the rubber (A) in the solvent, this procedure of dissolving has the defect that the solution viscosity becomes high. Advantageously, therefore, a procedure is employed which comprises first dissolving the resin (B) in the solvent, and then adding the rubber (A) to the resulting solution. Of course, it is possible to dissolve both in the solvent at the same time, or mix solutions of both with each other. At this time, blending agents in general use, such as process oils, antioxidants or fillers, may be added. Usually, mixing of the rubber (A) with the resin (B) in solvent is performed at room temperature, but the temperature is not particularly limited.

A pressure sensitive adhesive tape or sheet can be produced by coating the resulting solution of a mixture of the rubber and the resin on a base material such as papers, fabrics or plastic films and drying the coating. These products have superior tackiness and also superior adhesiveness and cohesive strength.

The following Referential Example and Examples illustrate the present invention more specifically. All parts used in these examples are by weight.

REFERENTIAL EXAMPLE

Various hydrocarbon resins having the structural units and softening points shown in Table 1 were prepared by copolymerizing the monomeric mixtures shown in Table 1 containing 1,3-pentadiene as a main ingredient in the presence of a benzene solvent using aluminum chloride as a catalyst.

The softening point was measured by a ring-and-ball method set forth in JIS K-2531, and the proportions of the structual units of the polymer were calculated by analyzing the proportions of the monomers charged and the proportions of the unreacted monomers recovered.

wide and 100 mm long, is adhered to the surface of a stainless steel plate polished with a water-resistant polishing paper (No. 280), and pulled in a direction with an angle of 180° at 25° C. at a speed of 200 mm/minutes. The adhesive strength is expressed by the force required to peel off the tape.

The cohesive strength is measured in accordance with JIS Z-1542. An adhesive tape is adhered to the surface of a similarly treated stainless steel plate so that its area of 25 mm × 10 mm may make contact with the stainless steel plate. At 40° C., a load of 1 kg is exerted, and the time required until a deviation of 1 mm occurs is measured. The cohesive strength is expressed by this time.

Table 2

| Pressure sensitive adhesive composition | | Hydrocarbon resin | Tackiness (1/32 inch) | Adhesive strength (g/inch) | Cohesive strength (minutes/mm) |
|---|---|---|---|---|---|
| Controls | A | A | 3 | 410 | 21 |
|  | B | B | 3 | 500 | 27 |
|  | C | C | 8 | 440 | 26 |
| Invention | D | D | 15 | 450 | 27 |
|  | E | E | 20 | 400 | 25 |
|  | F | F | 22 | 400 | 26 |
|  | G | G | 22 | 390 | 22 |
|  | H | H | 16 | 410 | 25 |
| Controls | I | I | 3 | 420 | 26 |
|  | J | J | 3 | 410 | 27 |
|  | K | Aliphatic hydrocarbon resin (*1) | 3 | 500 | 27 |
|  | L | Rosin derivative (*2) | 20 | 175 | 14 |

(*1) Commercially available; ESCOREZ 1103U, Tonen Sekiyu Kagaku K.K., softening point 100° C.
(*2) Glycerin ester of hydrogenated rosin with a softening point of 71° C.

Table 1

| Hydrocarbon resins | A | B | C | D | E | F | G | H | I | J |
|---|---|---|---|---|---|---|---|---|---|---|
| Structural units(%) | | | | | | | | | | |
| 1,3-pentadiene | 80 | 83 | 84 | 77 | 68 | 59 | 51 | 63 | 61 | 61 |
| α-methylstyrene | 20 | — | 4 | 11 | 22 | 26 | 40 | 23 | 21 | 21 |
| cyclopentene | — | 14 | 9 | 9 | 8 | 8 | 8 | 8 | 8 | 8 |
| 1,3-butadiene | — | — | — | — | — | 5 | — | — | — | — |
| dicyclopentadiene | — | — | — | — | — | — | — | 4 | 8 | — |
| isoprene | — | — | — | — | — | — | — | — | — | 8 |
| $C_{5-6}$ monoolefin | — | 3 | 3 | 3 | 2 | 2 | 1 | 2 | 2 | 2 |
| Softening point(° C.) | 115 | 120 | 104 | 106 | 103 | 85 | 93 | 101 | 113 | 115 |

EXAMPLE 1

100 Parts of natural rubber (pale crepe, Mooney viscosity $ML_{1+4}/100°$ C. = 60) was blended with 80 parts of each of the hydrocarbon resins shown in Table 2 and 1 part of an antioxidant, and then toluene was added to form a solution with a solids concentration of 15%. The solution was coated on a 1 mil-thick polyester film to a thickness of 25 microns to form a pressure sensitive adhesive tape. The tackiness, adhesiveness and cohesive strength of the pressure sensitive adhesive tape were measured, and the results are shown in Table 2.

The tackiness was measured in accordance with the J. Dow method [Roc. Inst. Rub. Ind., 1, 105 (1954)]. An adhesive tape, 10 cm long, is adhered to the inclined surface of a stainless steel plate inclined at an angle of 30° and 32 stainless balls differing in diameter from 1/32 inch to 1 inch are rolled down at a position 10 cm above the adhesive tape at an initial speed of 0 and allowed to stop on the adhesive tape by its tackiness. The tackiness is expressed by the diameter of the largest ball among those which stop at the tape surface.

The adhesive strength is measured in accordance with the method of JIS Z-1522. An adhesive tape, 25 mm The following conclusions can be drawn from the results shown in Table 2.

1. The pressure sensitive adhesive compositions (compositions D to H) of this invention have the same or greater performance as or than the pressure sensitive adhesive composition (composition L) containing a rosin derivative which has previously been in wide use.

2. The pressure sensitive adhesive comosition A or B containing a hydrocarbon resin composed of a binary copolymer of 1,3-pentadiene and α-methylstyrene or cyclopentene as a tackifying resin or the pressure sensitive adhesive compositions I and J which contains a hydrocarbon resin containing a large quantity of a unit derived from dicyclopentadiene or isoprene as a tackifying resin have far inferior tackiness to the pressure sensitive adhesive compositions of this invention.

EXAMPLE 2

100 Parts of a styrene/butadiene copolymer rubber (Nipol 1006, a product of Japanese Zeon Co., Ltd.; Mooney viscosity $ML_{1+4}/100°$ C. = 50) was blended with 80 parts of each of the hydrocarbon resins shown in Table 3 and 1 part of an antioxidant. Using the resulting mixtures, pressure sensitive adhesive tapes were prepared in the same way as in Example 1, and their properties were tested. The results are shown in Table 3.

Table 3

| Pressure sensitive adhesive composition | | Hydrocarbon resin | Tackiness (1/32 inch) | Adhesive strength (g/inch) | Cohesive strength (minutes/mm) |
|---|---|---|---|---|---|
| Invention | M | E | 5 | 3000 | 21 |
| | N | F | 10 | 3025 | 19 |
| Controls | O | I | Unmeasurable (*3) | | |
| | P | Aliphatic hydrocarbon resin (*1) | Unmeasurable (*3) | | |
| | Q | Rosin derivative (*2) | 13 | 3100 | 12 |

(*1) and (*2) have the same meanings as the footnote to Table 2.
(*3) means that the tape whitened and did not show any tackiness.

It is seen from Table 3 that the commercially available hydrocarbon resins cannot be used as a tackifying resin in SBR-type pressure sensitive adhesive compositions because of their inferior compatibility with SBR (styrene/butadiene copolymer rubber), but that when the hydrocarbon resin in accordance with the present invention is used as a tackifying resin, a pressure sensitive adhesive composition having comparable properties to a pressure senstive adhesive composition containing a rosin derivative as a tackifying resin can be obtained.

What we claim is:

1. A pressure sensitive adhesive composition comprising (A) 100 parts by weight of a conjugated diene rubber selected from the group consisting of natural rubber and synthetic rubber having a Mooney viscosity ($ML_{1+4}/100°$ C) of at least 30 and containing at least 50% by weight of a conjugated diolefin unit in the polymer chain, and (B) 30 to 250 parts by weight of a hydrocarbon resin having a softening point of 60° C to 140° C and consisting essentially of (a) 45 to 85% by weight of a unit derived from 1,3-pentadiene, (b) 10 to 45% by weight of a unit derived from α-methylstyrene, (c) 3 to 20% by weight of a unit derived from cyclopentene, (d) 0 to 20% by weight of a unit derived from 1,3-butadiene, and (e) 0 to 5% by weight of a unit derived from copolymerizable monomer selected from isoprene, cyclopentadiene and dicyclopentadiene.

2. A pressure sensitive adhesive composition comprising (A) 100 parts by weight of a conjugated diene rubber selected from the group consisting of natural rubber and synthetic rubber having a Mooney viscosity ($ML_{1+4}/100°$ C) of at least 30 and containing at least 50% by weight of a conjugated diolefin unit in the polymer chain, and (B) 50 to 200 parts by weight of a hydrocarbon resin having a softening point to 60° C to 120° C and consisting essentially of (a) 45 to 85% by weight of a unit derived from 1,3-pentadiene, (b) 10 to 45% by weight of a unit derived from α-methylstyrene, (c) 3 to 20% by weight of a unit derived from cyclopentene, and (d) 2 to 15% by weight of a unit derived from 1,3-butadiene.

3. The composition of claim 1 wherein the conjugated diene rubber is natural rubber.

4. The composition of claim 1 wherein the conjugated diene rubber is said synthetic rubber having a Mooney viscosity ($ML_{1+4}/100°$ C.) of at least 30 and containing at least 50% by weight of a conjugated diolefin unit in the polymer chain.

5. The composition of claim 4 wherein the synthetic rubber is polyisoprene, polybutadiene, a butadiene/styrene copolymer, a butadiene/isoprene copolymer, an isoprene/styrene copolymer or a butadiene/acrylonitrile copolymer.

6. The composition of claim 2 wherein the conjugated diene rubber is natural rubber.

7. The composition of claim 2 wherein the conjugated diene rubber is said synthetic rubber having a Mooney viscosity ($ML_{1+4}/100°C$) of at least 30 and containing at least 50% by weight of a conjugated diolefin unit in the polymer chain.

8. The composition of claim 7 wherein the synthetic rubber is polyisoprene, polybutadiene, a butadiene/styrene copolymer, a butadiene/isoprene copolymer, an isoprene/styrene copolymer or a butadiene/acrylonitrile copolymer.

9. The pressure-sensitive adhesive composition of claim 1 wherein the hydrocarbon resin (b) consists essentially of (a) 51 to 77% by weight of a unit derived from 1,3-pentadiene, (b) 11 to 40% by weight of a unit derived from α-methylstyrene, (c) 8 to 9% by weight of a unit derived from cyclopentene, (d) 0 to 5% by weight of a unit derived from 1,3-butadiene, (e) 0 to 4% by weight of a unit derived from dicyclopentadiene, and (f) 1 to 3% by weight of a monolefin having 5 to 6 carbon atoms, said hydrocarbon resin having a softening point in the range of from 85° to 106° C.

10. The pressure-sensitive adhesive composition of claim 9 having a tackiness, in terms of a diameter, in inches, of the largest stainless steel ball which will be stopped from rolling past a 10 cm long, 25 mil thick layer of the pressure-sensitive adhesive composition which is adhered to a stainless steel plate at an angle of 30° when the ball starts from rest at the beginning of the layer, of from 15/32 to 22/32 inch, an adhesive strength, measured in accordance with JIS Z-1522 of 390 to 450 g/inch, and a cohesive strength, measured in accordance with JIS Z-1542, of 22 to 27 minutes/mm.

* * * * *

UNITED STATES PATENT OFFICE
CERTIFICATE OF CORRECTION

Patent No. 4,048,124          Dated September 13, 1977

Inventor(s) Atsuo Ishikawa et al.

It is certified that error appears in the above-identified patent and that said Letters Patent are hereby corrected as shown below:

Claim 1, line 35, after "chain" insert -- wherein the synthetic rubber is polyisoprene, polybutadiene, a butadiene/isoprene copolymer, an isoprene/styrene copolymer or a butadiene/acrylonitrile copolymer --.

Claim 2, line 51, after "chain" insert -- wherein the synthetic rubber is polyisoprene, polybutadiene, a butadiene/isoprene copolymer, an isoprene/styrene copolymer of a butadiene/acrylonitrile copolymer --.

Please cancel claim 5 in its entirety and without prejudice.

Please cancel claim 8 in its entirety and without prejudice.

Signed and Sealed this

Third Day of January 1978

[SEAL]

Attest:

RUTH C. MASON
*Attesting Officer*

LUTRELLE F. PARKER
*Acting Commissioner of Patents and Trademarks*